US011769323B2

(12) United States Patent
Ashok et al.

(10) Patent No.: US 11,769,323 B2
(45) Date of Patent: Sep. 26, 2023

(54) GENERATING ASSISTIVE INDICATIONS BASED ON DETECTED CHARACTERS

(71) Applicant: Google LLC, Mountain View, CA (US)

(72) Inventors: Sneha Ashok, San Jose, CA (US); Huize Shi, Santa Clara, CA (US); Andreina Reyna, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 411 days.

(21) Appl. No.: 17/165,135

(22) Filed: Feb. 2, 2021

(65) Prior Publication Data
US 2022/0245382 A1   Aug. 4, 2022

(51) Int. Cl.
*G06V 30/148*   (2022.01)
*G06V 20/20*   (2022.01)
*G06N 20/00*   (2019.01)
*G06F 40/242*   (2020.01)
(Continued)

(52) U.S. Cl.
CPC .............. *G06V 20/20* (2022.01); *G06F 3/016* (2013.01); *G06F 3/165* (2013.01); *G06F 40/242* (2020.01);
(Continued)

(58) Field of Classification Search
CPC ........ G06V 20/20; G06V 10/40; G06V 10/82; G06V 30/153; G06V 30/414; G06V 30/41;
(Continued)

(56) References Cited

U.S. PATENT DOCUMENTS 5,687,253 A * 11/1997 Huttenlocher ....... G06V 10/754
382/177
7,840,033 B2   11/2010 Kurzweil et al.
(Continued)

FOREIGN PATENT DOCUMENTS

JP            H0634175 B2 *  5/1994
JP            2004171174 A *  6/2004
WO     WO-2006071574 A2 *  7/2006 ............... G09B 1/32

OTHER PUBLICATIONS

Mathur, R. S. H., Rahul Gupta, Sachi Choudhary, and Rashmi Sharma. "Sense it: Text recognition & text to speech conversion for visually challenged people using google cloud vision." Int. J. Sci. Res. Comput. Sci. Appl. Manag. Stud 7, No. 6 (2018): 1-4. (Year: 2018).*

(Continued)

*Primary Examiner* — Carol Wang
(74) *Attorney, Agent, or Firm* — Dority & Manning, P.A.

(57) ABSTRACT

Methods, systems, devices, and tangible non-transitory computer readable media for generating assistive indications are provided. The disclosed technology can include accessing image data that includes at least one image. Character data can be generated based at least in part on the image data and one or more optical character recognition operations. Further, the character data can include one or more characters associated with the at least one image. One or more characters that are associated with one or more recognized words and the one or more characters that are associated with one or more unrecognized words can be determined based on the character data. One or more auditory indications including a synthetic voice reciting the one or more recognized words and the one or more unrecognized words can be generated. Furthermore, the synthetic voice can recite each of the one or more unrecognized words one character at a time.

16 Claims, 9 Drawing Sheets

(51) Int. Cl.
*G06F 3/01* (2006.01)
*G06F 3/16* (2006.01)
*G10H 1/00* (2006.01)
*G10L 13/033* (2013.01)
*G06V 10/40* (2022.01)
*G06V 30/414* (2022.01)

(52) U.S. Cl.
CPC ............ *G06N 20/00* (2019.01); *G06V 10/40* (2022.01); *G06V 30/153* (2022.01); *G06V 30/414* (2022.01); *G10H 1/0008* (2013.01); *G10L 13/033* (2013.01)

(58) Field of Classification Search
CPC ........ G06F 3/016; G06F 3/165; G06F 40/242; G06N 20/00; G06N 3/044; G06N 3/045; G06N 3/084; G10H 1/0008; G10L 13/033
See application file for complete search history.

(56) References Cited

U.S. PATENT DOCUMENTS

| | | |
|---|---|---|
| 2006/0013483 A1 | 1/2006 | Kurzweil et al. |
| 2007/0020591 A1* | 1/2007 | AlSalem AlSabah . G09B 19/08 434/159 |
| 2016/0344860 A1 | 11/2016 | Chapman et al. |
| 2017/0286383 A1 | 10/2017 | Koul et al. |
| 2017/0337919 A1* | 11/2017 | Kato ....................... G10L 15/02 |
| 2020/0152083 A1 | 5/2020 | Dialameh et al. |

OTHER PUBLICATIONS

"KNFB Reader User Manual", K-NFB Reading Technology, Inc., 2014, www.vipconduit.com/terry/info/KNFBReaderManual.htm, retrieved on Feb. 2, 2021, 9 pages.

* cited by examiner

GENERATING ASSISTIVE INDICATIONS BASED ON DETECTED CHARACTERS

FIELD

The present disclosure relates generally to the generation of audio and visual outputs based on the detection or recognition of characters, More particularly, the present disclosure relates to providing reading assistance to visually impaired users.

BACKGROUND

A visually impaired individual can be presented with various challenges when attempting to read documents and may sometimes employ various measures to ensure that the content of written text is properly understood. Some of these measures can include the use of software applications that can detect text and describe the contents of the text to the visually impaired individual. In some cases, portions of the text may be obscured, which may result in the text being described in a manner that is unclear to the individual. Further, the user of the software application will generally prefer that the contents of a document be conveyed to the user in a seamless way that requires little interaction by the user. As such there exists a demand for a more effective way of reading text that is both easy for a user to use and has an intuitive interface that is readily managed.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of generating assistive indications based on detected characters. The computer-implemented method can include accessing, by a computing device comprising one or more processors, image data including at least one image. The computer-implemented method can include generating, by the computing device, based at least in part on the image data and one or more optical character recognition operations, character data including one or more characters associated with the at least one image. The computer-implemented method can include determining, by the computing device, the one or more characters that are associated with one or more recognized words and the one or more characters that are associated with one or more unrecognized words. Furthermore, the computer-implemented method can include generating, by the computing device, one or more auditory indications that can include a synthetic voice that recites the one or more recognized words and the one or more unrecognized words. The synthetic voice can recite each of the one or more unrecognized words one character at a time.

Another example aspect of the present disclosure is directed to one or more tangible non-transitory computer-readable media storing computer-readable instructions that when executed by one or more processors cause the one or more processors to perform operations. The operations can include accessing image data including at least one image. The operations can include generating, based at least in part on the image data and one or more optical character recognition operations, character data including one or more characters associated with the at least one image. The operations can include determining the one or more characters that are associated with one or more recognized words and the one or more characters that are associated with one or more unrecognized words. Furthermore, the operations can include generating one or more auditory indications that can include a synthetic voice that recites the one or more recognized words and the one or more unrecognized words. The synthetic voice can recite each of the one or more unrecognized words one character at a time.

Another example aspect of the present disclosure is directed to a computing system comprising: one or more processors; one or more non-transitory computer-readable media storing instructions that when executed by the one or more processors cause the one or more processors to perform operations. The operations can include accessing image data including at least one image. The operations can include generating, based at least in part on the image data and one or more optical character recognition operations, character data including one or more characters associated with the at least one image. The operations can include determining the one or more characters that are associated with one or more recognized words and the one or more characters that are associated with one or more unrecognized words. Furthermore, the operations can include generating one or more auditory indications that can include a synthetic voice that recites the one or more recognized words and the one or more unrecognized words. The synthetic voice can recite each of the one or more unrecognized words one character at a time.

Other aspects of the present disclosure are directed to various systems, apparatuses, non-transitory computer-readable media, user interfaces, and electronic devices for the generation of assistive indications based on detected characters.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
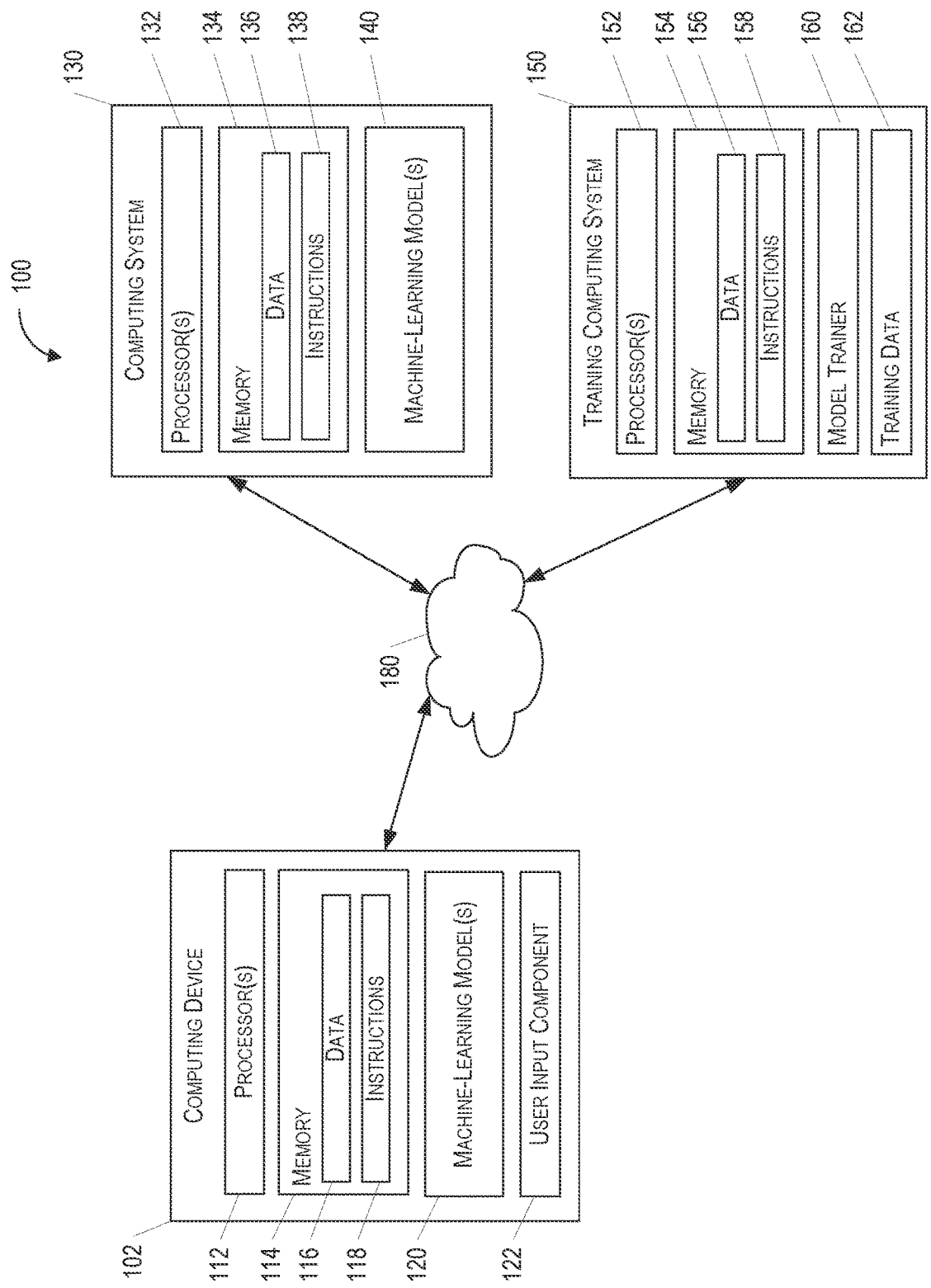
FIG. 1A depicts a block diagram of an example computing system that performs operations associated with the generation of assistive indications based on detected characters according to example embodiments of the present disclosure.

Reference numerals that are repeated across plural figures are intended to identify the same features in various implementations.

DETAILED DESCRIPTION

Generally, the present disclosure is directed to the generation of assistive indications based on detected characters. Example aspects of the present disclosure are directed to an assistive indication system that can be used to detect characters (e.g., characters that are part of some text) and generate a synthetic voice that reads the detected characters aloud and spells out each character of words that were not recognized. Further, the assistive indication system may be particularly beneficial to visually impaired users who face challenges when attempting to read documents. For example, the disclosed technology may facilitate the user's comprehension of a document by providing an auditory indication (e.g., a chime) to indicate when a portion of detected characters was not properly recognized such as when some part of a document is obstructed from view or hidden due to the document being folded over. In this way, the user can receive advance notification that a word may be incomplete which can be followed by a synthetic voice that spells out the incomplete word in a letter by letter fashion that may be easier to understand.

Furthermore, the assistive indication system can be configured to generate other types of indications including visual indications and/or haptic indications. For example, visual indications can be used to highlight the portions of the characters that are being read aloud by the synthetic voice. Further, haptic indications, such as vibrations of a user's computing device can be used to notify the user when an incomplete word has been detected.

In some implementations, the assistive indication system can be located on and implemented on a user's computing device (e.g., smartphone or other mobile device) to assist the user in reading written documents. Additionally, the assistive indication system may be located at a remote server computing system and can provide assistive indications to client devices including associated mobile devices. In some implementations, the assistive indication system can include and use one or more machine-learned models (e.g., "on-device" machine learned models) to perform optical character recognition and/or determine the layout and other aspects of printed documents. Further, assistive indications can include any combination of auditory indications, visual indications, and/or haptic indications that can be used to assist a user in determining the content of a document that includes one or more characters.

By way of example, a computing device (e.g., a mobile computing device) implementing the disclosed technology can access image data that includes an image of a document that was captured by a camera associated with the computing device. In this example, the document may include a folded page that cuts off a portion of the characters that are visible in the image. For example, a line of characters that is intended to read "DECLINE AND FALL OF THE ROMAN EMPIRE" may instead read "DECLINE AND FALL OF THE ROMAN EMPI" as a result of the page having been folded. The computing device can use the image data as an input on which optical character recognition operations are performed. The computing device can then generate character data that includes the characters associated with the image (e.g., "DECLINE AND FALL . . . "). Using the recognized characters, the computing system can then determine the characters that are associated with recognized words (e.g., complete words such as "DECLINE") and characters that are associated with unrecognized words (e.g., "EMPI").

Furthermore, the computing device can generate auditory indications that include a synthetic voice that recites the recognized words (e.g., "DECLINE AND FALL . . . ") and then spells out the unrecognized words one character at a time (e.g., "E," followed by a short pause, then "M," followed by another short pause, then "P." and so on and so forth). In this way, the disclosed technology can provide a visually impaired user with assistance when reading documents that may include incomplete or obscured words that might otherwise be read in a way that obscures the meaning of the text (e.g., a synthetic voice that recites the characters "EMPI" as if "EMPI" was an actual word).

Accordingly, the disclosed technology may improve the effectiveness with which written documents are read aloud to users. Further, the disclosed technology can facilitate reading documents to visually impaired users by providing auditory, visual, and/or haptic indications and/or cues to alert the user that a particular word may be incomplete. Additionally, the disclosed technology can operate with a low level of input from the user, so that the user is not required to, for example, search for and touch incomplete or non-dictionary words (e.g., unrecognized words) that were read aloud.

The computing device can access data which can include image data. The image data can be associated with and/or include at least one image. For example, the image data can include an image of a document that was captured using a camera of the computing device (e.g., a mobile device). The image data can be based at least in part on output from one or more sensors associated with one or more image capture devices that are configured to capture one or more images. In some embodiments, the image data can be based at least in part on video that includes a plurality of images (e.g., images that were recorded sequentially).

In some embodiments, the image data can be captured via one or more sensors which can include one or more cameras. For example, the computing device can be configured with a front and/or rear camera that can be used to capture the at least one image included in the image data.

The computing device can generate data which can include character data. Generating the character data can be based at least in part on the image data and one or more optical character recognition operations. The character data can include one or more characters associated with the at least one image. By way of example, the one or more characters can include numbers, letters (uppercase letters, lowercase letters, and letters using different fonts), punctuation, currency symbols, mathematical symbols, scientific symbols, whitespace (e.g., the space between characters), underlining, underscores, and/or emojis. Further, the one or more characters can be associated with a character encoding (e.g., ASCII or Unicode).

By way of further example, the computing device can perform optical character recognition operations to detect the characters that are visible on an image captured by an image capture device (e.g., a camera). In some embodiments, the optical character recognition operations can include the use of one or more machine-leaned models that are configured and/or trained to extract features of an image, detect one or more characters, and/or recognize one or more characters. Further, the one or more machine-learned models can be configured and/or trained to detect and/or recognize one or more words, one or more recognized words, and/or one or more unrecognized words.

The computing device can determine the one or more characters that are associated with one or more recognized words and/or the one or more characters that are associated with one or more unrecognized words. For example, the computing device can cluster the one or more characters into words based at least in part on the spacing of the characters (e.g., characters separated by less than a predetermined distance may be determined to be part of the same word). the computing device can then generate compare the words to words stored in a database of known words (e.g., dictionary words) and determine that the words that match are recognized words and that the words that do not match are unrecognized words.

The computing device can generate one or more auditory indications. The one or more auditory indications can include a synthetic voice that recites the one or more recognized words and the one or more unrecognized words. Further, the synthetic voice can recite each of the one or more unrecognized words one character at a time. For example, the computing device can be configured to receive the one or more characters as an input and generate the synthetic voice using one or more speech synthesis techniques to concatenate the one or more characters into the one or recognized words and/or the one or unrecognized words.

The computing device can generate one or more visual indications. The one or more visual indications can be based at least in part on the character data. Further, the one or more visual indications can be associated with the one or more characters. For example, the one or more indications can highlight the one or more characters that will be, or are being, recited by the synthetic voice. In some embodiments, the one or more characters can be highlighted as the one or more characters are recited by the synthetic voice and the highlighting can be removed when each word has been completely recited.

In some embodiments, the one or more visual indications can include one or more colors highlighting the one or more characters, one or more shapes around the one or more characters, darkening the one or more characters, and/or lightening the one or more characters.

Determining the one or more characters that are associated with one or more recognized words and the one or more characters that are associated with one or more unrecognized words can include determining one or more edges of a document depicted in the at least one image. For example, the computing device can use one or more edge detection techniques to detect the edges of a document. By way of further example, the computing device can detect features of an image including shadows and lines that may indicate the presence of one or more edges. The edges of a document can, for example, include the inner portion of a book where pages are joined to the book's spine, any of the edges of a book's pages, and/or margins that separate text that is arranged in multiple columns on a single page.

Further, determining the one or more characters that are associated with one or more recognized words and the one or more characters that are associated with one or more unrecognized words can include determining one or more edges of a document depicted in the at least one image can include determining that the one or more unrecognized words include the one or more characters that are less than a predetermined distance from the one or more edges.

Further, determining the one or more characters that are associated with one or more recognized words and the one or more characters that are associated with one or more unrecognized words can include determining one or more words in the at least one image based at least in part on a spacing between the one or more characters. For example, the computing device can determine that one or more characters that are separated by less than a predetermined distance are part of the same word. By way of further example, the computing device can determine that one or more characters that are separated by greater than a predetermined distance are different words.

Further, the computing device can compare each of the one or more words to a plurality of dictionary words. For example, a plurality of dictionary words can be stored on the computing device and the computing device can determine compare the one or more characters in each of the one or more words to one or more characters in each of the plurality of dictionary words. Further, comparing each of the one or more words to a plurality of dictionary words can include comparing the order of the one or more characters and the number of the one or more characters in the one or more words and the plurality of dictionary words.

The computing device can determine that the one or more unrecognized words are the one or more words that do not match any of the plurality of dictionary words. For example, the computing device can mark each of the one or more words that do not match any of the plurality of dictionary words as being an unrecognized word.

In some embodiments, determining the one or more unrecognized words can include using the one or words as part of an input to a hash function and generating a hash value based at least in part on the input. The one or more unrecognized words can include the one or words that do not match a corresponding set of hash values associated with the one or more characters in the plurality of dictionary words.

In some embodiments, generating the character data can include determining a layout of the one or more characters with respect to the at least one image. For example, the computing device can analyze the at least one image and determine the absolute position and/or location of the one or more characters within the at least one image, the relative position and/or location of each of the one or more characters relative to the other characters of the one or more characters.

In some embodiments, generating the character data can include generating the character data based at least in part on the layout. For example, the character data can include information associated with the layout of the one or more characters.

In some embodiments, the layout can include an arrangement of the one or more characters. The arrangement of the one or more characters can indicate a reading direction of the one or more characters. For example, the arrangement of the one or more characters can indicated whether the one or more characters are read left to right or right to left. Further, the arrangement of the one or more characters can indicate the absolute position and/or location of the one or more characters within the at least one image, the relative position and/or location of each of the one or more characters relative to the other characters of the one or more characters.

The computing device can generate one or more haptic indications. The one or more haptic indications can be based at least in part on the character data. For example, the computing device can include one or more haptic motors that can generate vibrations based at least in part on one or more portions of the character data. For example, the one or more haptic indications can be generated when one or more unrecognized are being recited by the synthetic voice.

In some embodiments, the one or more haptic indications are generated before each of the one or more unrecognized words is recited by the synthetic voice. For example, the one or more haptic indications can be generated one (1) second before one or more unrecognized words will be recited by the synthetic voice. In this way, the user can receive an indication that the following word will be recited as a whole word and not character by character.

In some embodiments, the one or more haptic indications are generated after each of the one or more unrecognized words is recited by the synthetic voice. For example, the one or more haptic indications can be generated half (0.5) a second after one or more unrecognized words are recited by the synthetic voice. In this way, the user can receive an indication that the following word will be recited character by character and not as a whole word.

In some embodiments, the one or more optical character recognition operations can include one or more operations performed by one or more machine-learned models configured to receive the image data as input and generate output can include the character data. Further, the computing device can include one or more machine-learned models that are configured and/or trained to recognize one or more characters and/or one or more words based at least in part on one or more features that are extracted from the image data.

In some embodiments, an amplitude of the synthetic voice is modified (e.g., increased or decreased) when the one or more unrecognized words are being recited by the synthetic voice. For example, the computing device can increase the amplitude or volume of the synthetic voice by a predetermined amount (e.g., four (4) decibels) when the one or more unrecognized words are being recited by the synthetic voice.

In some embodiments, the one or more auditory indications can include an auditory indication that occurs a predetermined amount of time before each of the one or more unrecognized words is recited by the synthetic voice. For example, the one or more auditory indications can be generated one (1) second before one or more unrecognized words are recited by the synthetic voice. In this way, the user can be notified that the following word will be recited character by character and not as a whole word.

In some embodiments, the one or more auditory indications can include an auditory indication that occurs a predetermined amount of time after each of the one or more unrecognized words is recited by the synthetic voice. For example, the one or more auditory indications can be generated one (1) second after one or more unrecognized words are recited by the synthetic voice. In this way, the user can be notified that the following word will be recited as a whole word and not spelled out character by character.

In some embodiments, the one or more auditory indications can include one or more musical tones. For example, the computing device can include loudspeakers that generate the one or more musical tones to indicate that one or more unrecognized words will be recited by a synthetic voice.

In some embodiments, the one or more musical tones are generated before each of the one or more unrecognized words recited by the synthetic voice. For example, a chime composed of two musical notes can be generated half a second before the one or more unrecognized words are recited by the synthetic voice. In this way, the one or more musical tones can signal a user to be ready to hear a word that is spelled out character by character.

In some embodiments, the recitation of each character of the one or more unrecognized words by the synthetic voice can be preceded by a pause of predetermined duration. For example, the synthetic voice can pause for two-tenths (0.2) of a second after reciting each character of the one or more unrecognized words. Slowing down the recital of each character of the one or more unrecognized words may make the one or more unrecognized words more easily understood by a visually impaired user.

The disclosed technology can include a computing system and/or computing device (e.g., the computing device) that is configured to perform various operations associated with the generation of assistive indications and recognition of characters and/or words of documents. In some embodiments, the computing system and/or computing device can be associated with various computing systems and/or devices that use, send, receive, and/or generate information and/or data associated with the generation of assistive indications and recognition of characters and/or words of documents. Furthermore, the computing system and/or computing device can process, generate, modify, and/or access (e.g., send and/or receive) data and/or information including data and/or information associated with images, characters, words, and/or text.

The computing system and/or computing device can include specialized hardware and/or software that enable the performance of one or more operations specific to the disclosed technology. The computing system and/or computing device can include one or more application specific integrated circuits that are configured to perform operations associated with the recognizing characters including textual characters, based on input images e input images associated with image data) and generating auditory (e.g., a synthetic voice reciting words that include the characters) and visual indications (e.g., highlighting the characters) based on the recognized characters.

The systems, methods, devices, apparatuses, and tangible non-transitory computer-readable media in the disclosed technology can provide a variety of technical effects and benefits including an improvement in the generation of assistive indications. In particular, the disclosed technology may assist a user (e.g. a visually impaired user of a computing device) in performing a technical task by means of a continued and/or guided human-machine interaction process in which assistive indications (e.g., auditory indications, visual indications, and/or haptic indications) are provided to a user based on the recognition and/or detection of characters in an image. Furthermore, the disclosed technology may also provide benefits including improvements in device ergonomics, better resource usage efficiency, and improved comprehensibility of text to speech recited by a synthetic voice.

The systems, methods, devices, and non-transitory computer-readable media in the disclosed technology can provide a variety of technical effects and benefits to the overall ergonomics and ease of use when using a computing device to read text. For example, after capturing an image of a document, the disclosed technology can generate a synthetic voice that reads back recognized words and spells out unrecognized words with minimal input or interaction from the user.

Furthermore, the disclosed technology provides a solution to the problem of low comprehension of synthetic voices that generate unrecognized words (e.g., incomplete words and/or words that do not correspond to at least one dictionary word) by providing an indication to the user that an unrecognized word will be recited. Further, the disclosed technology can improve the comprehension of unrecognized words by reciting the unrecognized word one character at a time. By generating improved output that can improve user comprehension of words recited by a synthetic voice, the disclosed technology can also reduce the number, type, and complexity of burdensome interactions that result when a user pauses the synthetic voice and/or replays the words that the synthetic voice recited. Aside from improving user comprehension, this also allows for more efficient use of the associated computing device, thereby conserving computational and battery resources of the computing device by minimizing the number of times that words recited by a synthetic voice are repeated.

As such, the disclosed technology may assist a user (e.g., a visually impaired user) by more effectively performing a variety of tasks with the specific benefits of improved device ergonomics, improved comprehensibility of a synthetic voice, and reduced resource consumption. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the generation of assistive indications.

With reference now to the Figures, example embodiments of the present disclosure will be discussed in further detail.

FIG. 1A depicts a block diagram of an example computing system 100 that performs operations associated with the generation assistive indications based on detected characters according to example embodiments of the present disclosure. The system 100 includes a computing device 102, a server computing system 130, and a training computing system 150 that are communicatively coupled over a network 180.

The computing device 102 can be any type of computing device, such as, for example, a personal computing device laptop or desktop), a mobile computing device (e.g., smartphone or tablet), a gaming console or controller, a wearable computing device, an embedded computing device, or any other type of computing device.

The computing device 102 includes one or more processors 112 and a memory 114, The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM. EPROM, flash memory devices, magnetic disks, etc., and combinations thereof. The memory 114 can store data 116 and instructions 118 which are executed by the processor 112 to cause the computing device 102 to perform operations.

In some implementations, the computing device 102 can store or include one or more machine-learned models 120, For example, the one or more machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example one or more machine-learned models 120 are discussed with reference to FIGS. 1A-7.

In some implementations, the one or more machine-learned models 120 can be received from the server computing system 130 over network 180, stored in the computing device memory 114, and then used or otherwise implemented by the one or more processors 112. In some implementations, the computing device 102 can implement multiple parallel instances of a single machine-learned model 120 (e.g., to perform parallel operations to generate assistive indications across multiple instances of a user interface implemented on multiple respective computing devices).

More particularly, the one or more machine-learned models 120 can be configured and/or trained to access image data, perform optical character recognition operations, generate character data, determine characters that are associated with one or more recognized words and/or one or more unrecognized words, and generate indications including auditory indications, visual indications, and/or haptic indications.

Additionally, or alternatively, one or more machine-learned models 140 can be included in or otherwise stored and implemented by the server computing system 130 that communicates with the computing device 102 according to a client-server relationship. For example, the one or more machine-learned models 140 can be implemented by the server computing system 140 as a portion of a web service (e.g., an optical character recognition and assistive indication generation service). Thus, one or more models 120 can be stored and implemented at the computing device 102 and/or one or more models 140 can be stored and implemented at the server computing system 130.

The computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM. EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-7.

The computing device 102 and/or the server computing system 130 can train the models 120 and/or 140 via interaction with the training computing system 150 that is communicatively coupled over the network 180, The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, one or more images documents, one or more images one or more characters, and/or information associated with one or more attributes of the documents and one or more characters.

In some implementations, if the user has provided consent, the training examples can be provided by the computing device 102. Thus, in such implementations, the model 120 provided to the computing device 102 can be trained by the training computing system 150 on user-specific data received from the computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety; of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned models) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned models) can process the image data to generate an upscaled image data output. As another example, the machine-learned model(s) can process the image data to generate a prediction output. As another example, the machine-learned model(s) can process the image data to generate character data output including one or more characters.

In some implementations, the input to the machine-learned model(s) of the present disclosure can be text (e.g., text including one or more characters) or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is of higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output. Furthermore, the speech data can be based at least in part on the character data and can be used to generate a synthetic voice that recites one or words (e.g., one or more recognized words and/or one or more unrecognized words), and/or one or more characters.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the computing device 102 can include the model trainer 160 and the training dataset 162. In such implementations, the models 120 can be both trained and used locally at the computing device 102. In some of such implementations, the computing device 102 can implement the model trainer 160 to personalize the models 120 based on user-specific data.

Figure 1B:
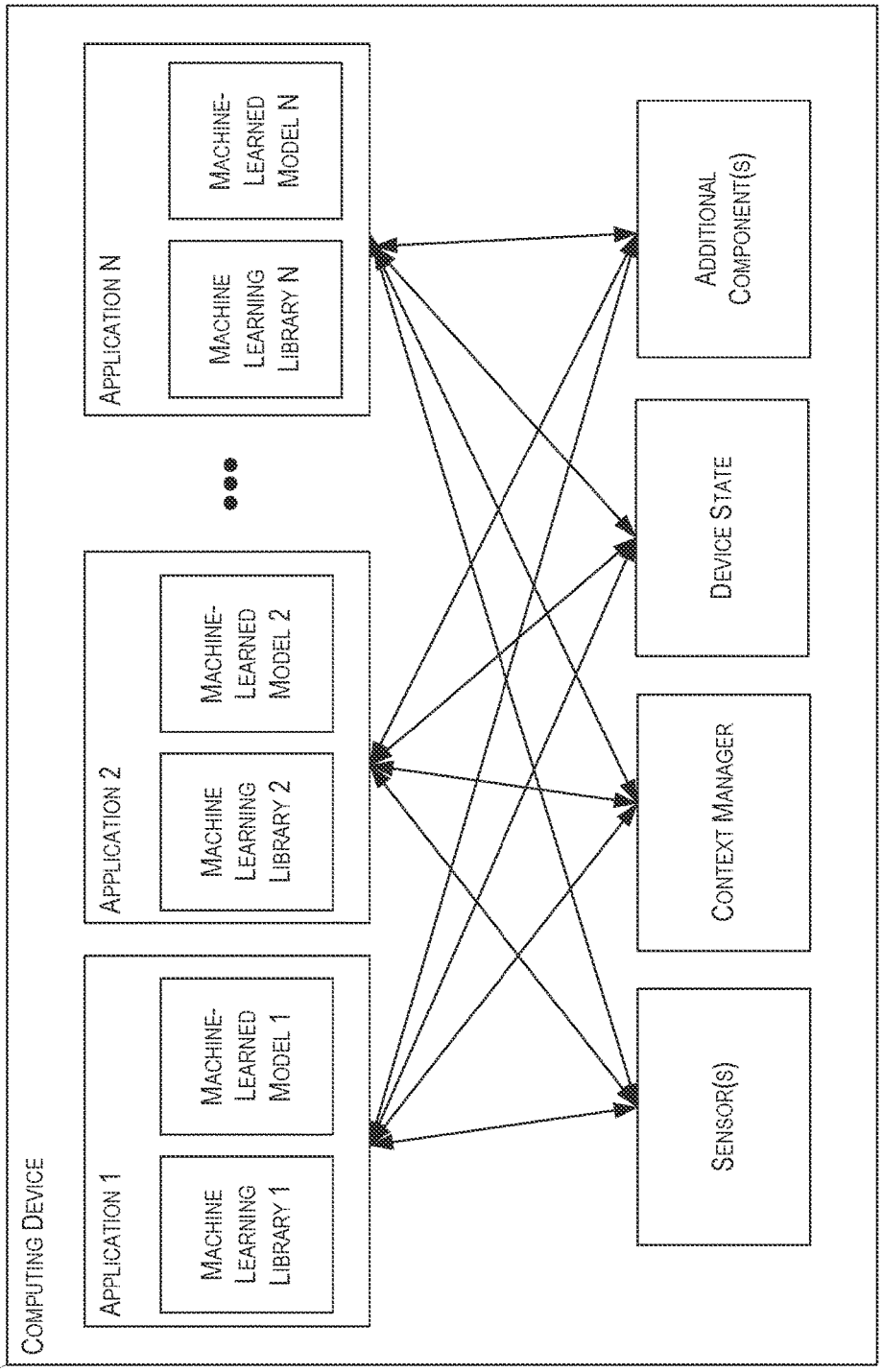
FIG. 1B depicts a block diagram of an example computing device that performs operations associated with the generation of assistive indications based on detected characters according to example embodiments of the present disclosure.

FIG. 1B depicts a block diagram of an example computing device 10 that performs according to example embodiments of the present disclosure. The computing device 10 can be a computing device or a server computing device.

The computing device 10 includes a number of applications (e.g., applications 1 through N). Each application contains its own machine learning library and machine-learned model(s). For example, each application can include a machine-learned model, Example applications include a text to speech application, an optical character recognition application, text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
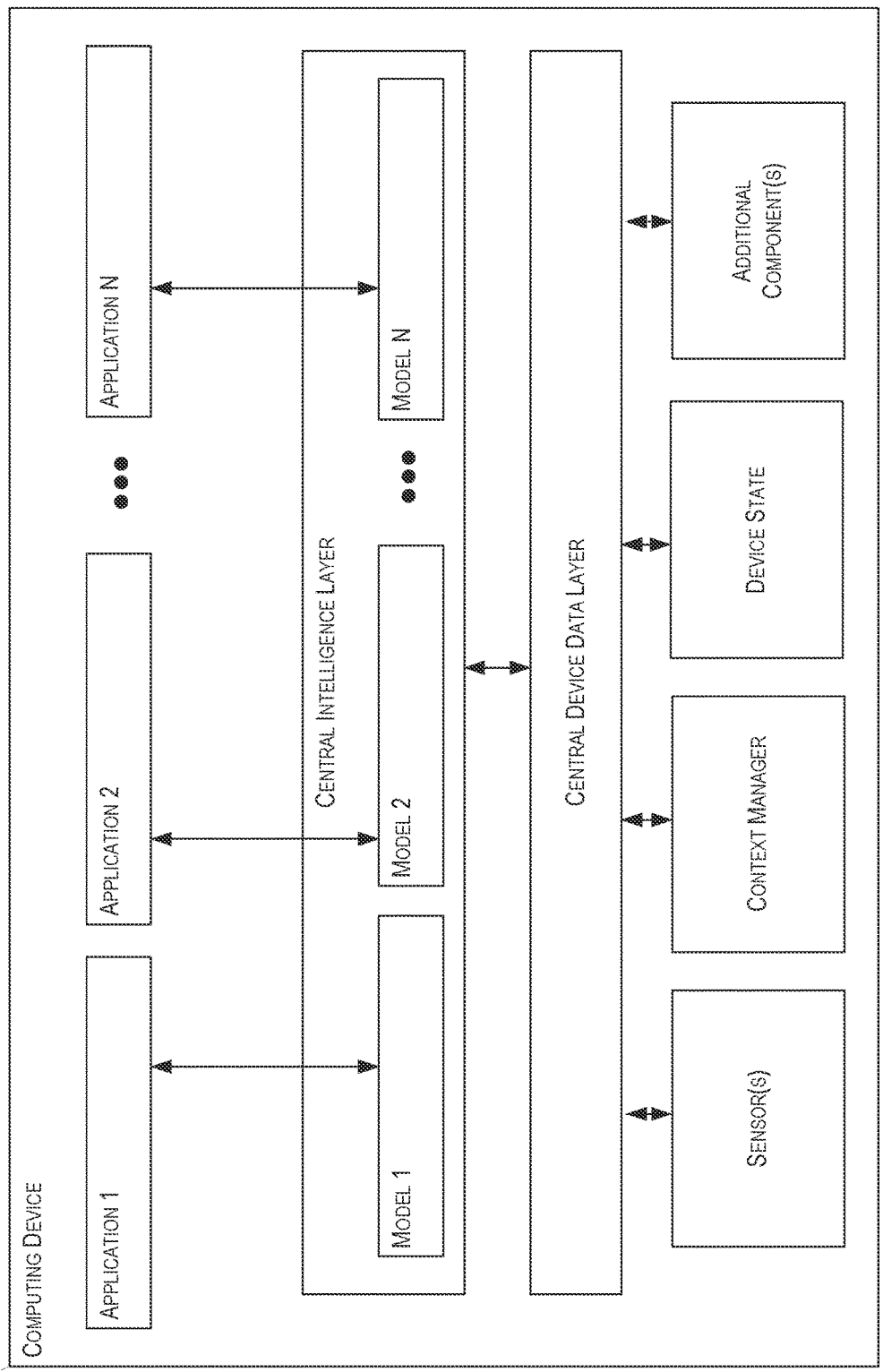
FIG. 1C depicts a block diagram of an example computing device that performs operations associated with the generation of assistive indications based on detected characters according to example embodiments of the present disclosure.

FIG. 1C depicts a block diagram of an example computing device 50 that performs according to example embodiments of the present disclosure. The computing device 50 can be a computing device or a server computing device.

The computing device 50 includes a number of applications (e.g., applications 1 through N). Each application is in communication with a central intelligence layer. Example applications include a text to speech application, an optical character recognition application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
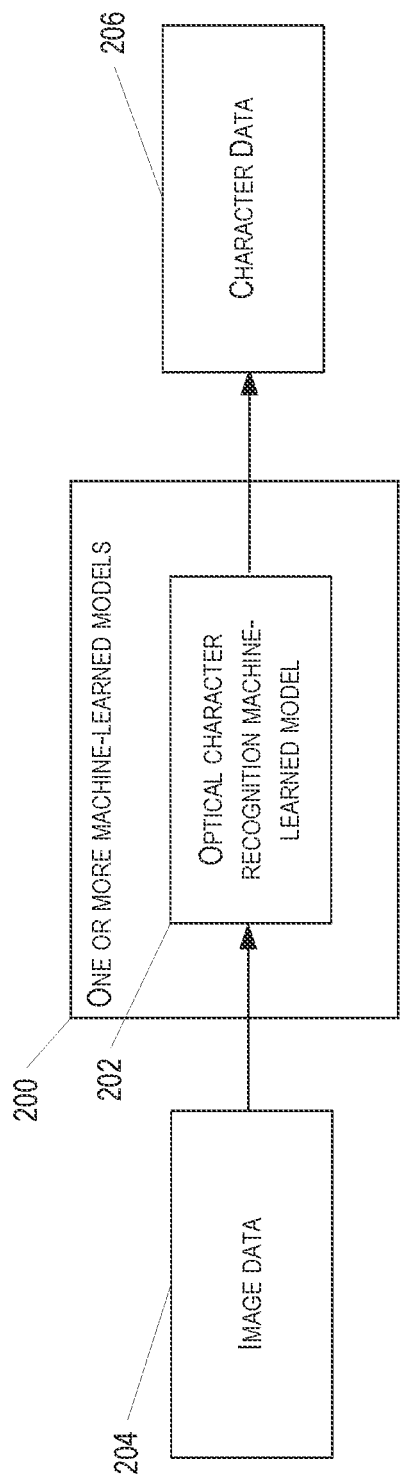
FIG. 2 depicts a block diagram of an example of one or more machine-learned models according to example embodiments of the present disclosure.

FIG. 2 depicts a block diagram of an example of one or more machine-learned models 200 according to example embodiments of the present disclosure. In some implementations, the one or more machine-learned models 200 are trained to receive a set of input data 204 descriptive of an image (e.g., image data that includes at least one image) and, after performing one or more operations on the input data 204, generating an output including the character data 206 that can include one or more characters and/or one or more words (e.g., one or more recognized words and/or one or more unrecognized words). Thus, in some implementations, the one or more machine-learned models 200 can include an optical character recognition machine-learned model 202 that is operable to generate output that can be used to assist a user in reading written content that is extracted from an image.

Figure 3:
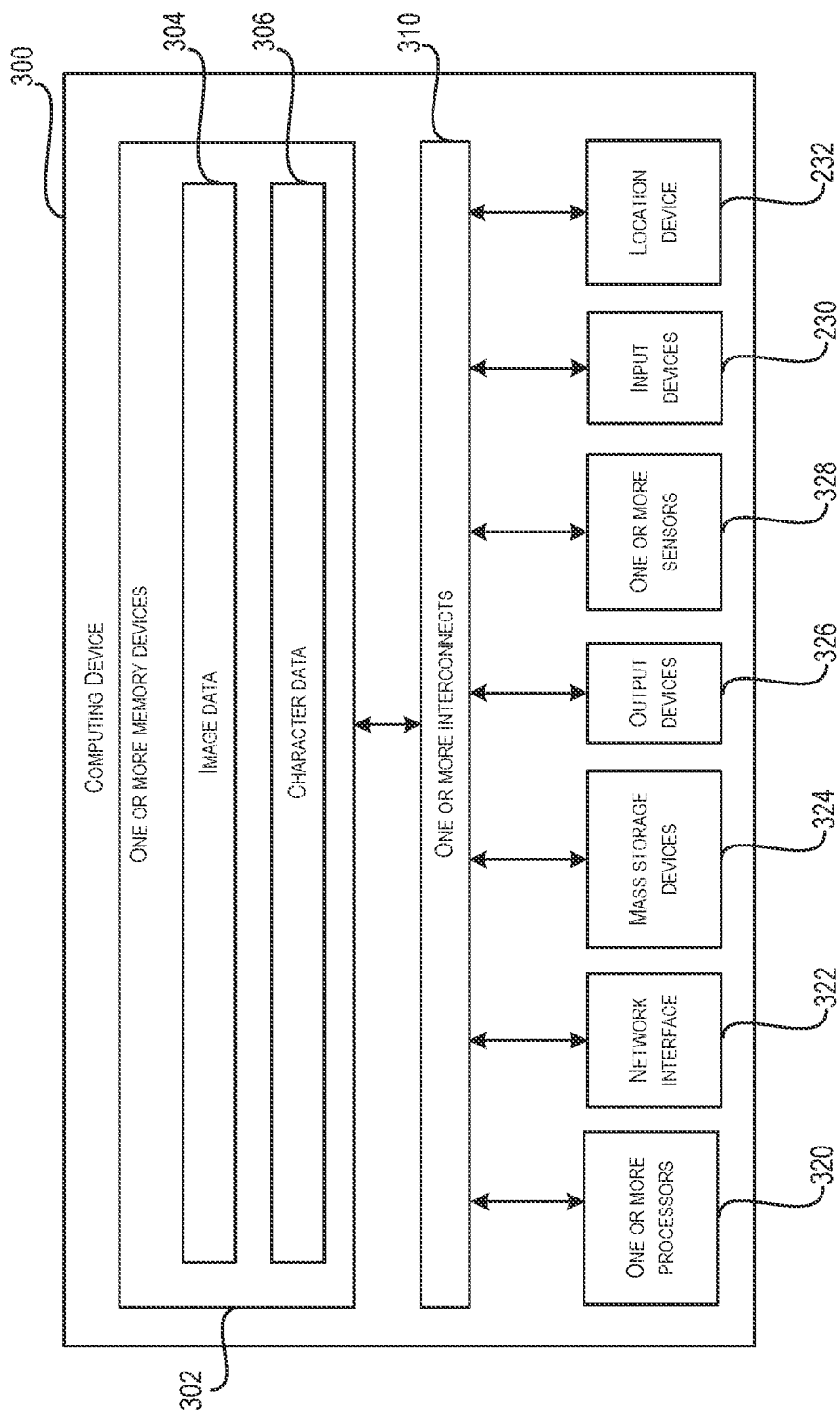
FIG. 3 depicts an example of a computing device according to example embodiments of the present disclosure.

FIG. 3 depicts a diagram of an example computing device according to example embodiments of the present disclosure, A computing device 300 can include one or more attributes and/or capabilities of the computing device 102, the computing system 130, and/or the training computing system 150. Furthermore, the computing device 300 can perform one or more actions and/or operations including the one or more actions and/or operations performed by the computing device 102, the computing system 130, and/or the training computing system 150, which are depicted in FIG. 1A.

As shown in FIG. 3, the computing device 300 can include one or more memory devices 302, image data 304, character data 306, one or more machine-learned models 308, one or more interconnects 310, one or more processors 320, a network interface 322, one or more mass storage devices 324, one or more output devices 326, one or more sensors 328, one or more input devices 330, and/or the location device 332.

The one or more memory devices 302 can store information and/or data (e.g., the image data 304, the character data 306, and/or the one or more machine-learned models 308). Further, the one or more memory devices 302 can include one or more non-transitory computer-readable storage media, including RAM, ROM, EEPROM, EPROM, flash memory devices, magnetic disks, and combinations thereof. The information and/or data stored by the one or more memory devices 302 can be executed by the one or more processors 320 to cause the computing device 300 to perform operations including operations associated with optical character recognition, distinguishing recognized words from unrecognized words, and generating indications including auditory indications, visual indications, and haptic indications.

The image data 304 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the image data 304 can include information associated with at least one image that can include an image captured by an image capture device (e.g., a camera) of the one or more sensors 328. In some embodiments, the image data 304 can be received from one or more computing systems (e.g., the computing system 130 that is depicted in FIG. 1) which can include one or more computing systems that are remote (e.g., in another room, building, part of town, city, or nation) from the computing device 300.

The character data 306 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154, respectively. Furthermore, the character data 306 can include information associated with one or more characters that are recognized and/or detected in the image data 304 and which can be processed by the computing device 300. In some embodiments, the character data 306 can be received from one or more computing systems (e.g., the computing system 130 that is depicted in FIG. 1) which can include one or more computing systems that are remote from the computing device 300.

The one or more machine-learned models 308 (e.g., the one or more machine-learned models 120 and/or the one or more machine-learned models 140) can include one or more portions of the data 116, the data 136, and/or the data 156 which are depicted in FIG. 1A and/or instructions (e.g., the instructions 118, the instructions 138, and/or the instructions 158 which are depicted in FIG. 1A) that are stored in the memory 114, the memory 134, and/or the memory 154 respectively. Furthermore, the one or more machine-learned models 308 can include information associated with accessing image data, performing optical character recognition operations, generating character data, determining characters that are associated with one or more recognized words and/or one or more unrecognized words, and generating indications including auditory indications, visual indications, and haptic indications that can be used to assist a user (e.g., a visually impaired user). In some embodiments, the one or more machine-learned models 308 can be received from one or more computing systems (e.g., the computing system 130 that is depicted in FIG. 1) which can include one or more computing systems that are remote from the computing device 300.

The one or more interconnects 310 can include one or more interconnects or buses that can be used to send and/or receive one or more signals (e.g., electronic signals) and/or data (e.g., the image data 304, the character data 306, and/or the one or more machine-learned models 308) between components of the computing device 300, including the one or more memory devices 302, the one or more processors 320, the network interface 322, the one or more mass storage devices 324, the one or more output devices 326, the one or more sensors 328 (e.g., a sensor array), and/or the one or more input devices 330. The one or more interconnects 310 can be arranged or configured in different ways including as parallel or serial connections. Further the one or more interconnects 310 can include one or more internal buses to connect the internal components of the computing device 300; and one or more external buses used to connect the internal components of the computing device 300 to one or more external devices. By way of example, the one or more interconnects 310 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 320 can include one or more computer processors that are configured to execute the one or more instructions stored in the one or more memory devices 302. For example, the one or more processors 320 can, for example, include one or more general purpose central processing units (CPUs), application specific integrated circuits (ASICs), and/or one or more graphics processing units (GPUs). Further, the one or more processors 320 can perform one or more actions and/or operations including one or more actions and/or operations associated with the image data 304, the character data 306, and/or the one or more machine-learned models 308. The one or more processors 320 can include single or multiple core devices including a microprocessor, microcontroller, integrated circuit, and/or a logic device.

The network interface 322 can support network communications. For example, the network interface 322 can support communication via networks including a local area network and/or a wide area network (e.g., the Internet). The one or more mass storage devices 324 (e.g., a hard disk drive and/or a solid state drive) can be used to store data including the image data 304, and/or the character data 306. The one or more output devices 326 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more sensors 328 can be configured to detect various states and can include one or more cameras, one or more light detection and ranging (LiDAR) devices, one or more sonar devices, and/or one or more radar devices. Further, the one or more sensors 328 can generate one or more outputs that can be used to generate data including the image data 304.

The one or more input devices 330 can include one or more keyboards, one or more touch sensitive devices (e.g., a touch screen display), one or more buttons (e.g., ON/OFF buttons and/or YES/NO buttons), one or more microphones, and/or one or more cameras (e.g., cameras that are used to unlock a device based on facial recognition).

The one or more memory devices 302 and the one or more mass storage devices 324 are illustrated separately, however, the one or more memory devices 302 and the one or more mass storage devices 324 can be regions within the same memory module. The computing device 300 can include one or more additional processors, memory devices, network interfaces, which may be provided separately or on the same chip or board. The one or more memory devices 302 and the one or more mass storage devices 324 can include one or more computer-readable media, including, but not limited to, non-transitory computer-readable media, RAM, ROM, hard drives, flash drives, and/or other memory devices.

The one or more memory devices 302 can store sets of instructions for applications including an operating system that can be associated with various software applications or data. For example, the one or more memory devices 302 can store sets of instructions for applications that include a user interface that can receive input and generate output. The one or more memory devices 302 can be used to operate various applications including a mobile operating system developed specifically for mobile devices. As such, the one or more memory devices 302 can store instructions that allow the software applications to access data including data associated with the generation of assistive indications based on detection and/or recognition of characters extracted from an image. In other embodiments, the one or more memory devices 302 can be used to operate or execute a general-purpose operating system that operates on both mobile and stationary devices, including for example, smartphones, laptop computing devices, tablet computing devices, and/or desktop computers.

The software applications that can be operated or executed by the computing device 300 can include applications associated with the system 100 shown in FIG. 1A. Further, the software applications that can be operated and/or executed by the computing device 300 can include native applications and/or web-based applications.

The location device 332 can include one or more devices or circuitry for determining the position of the computing device 300. For example, the location device 332 can determine an actual and/or relative position of the computing device 300 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 4:
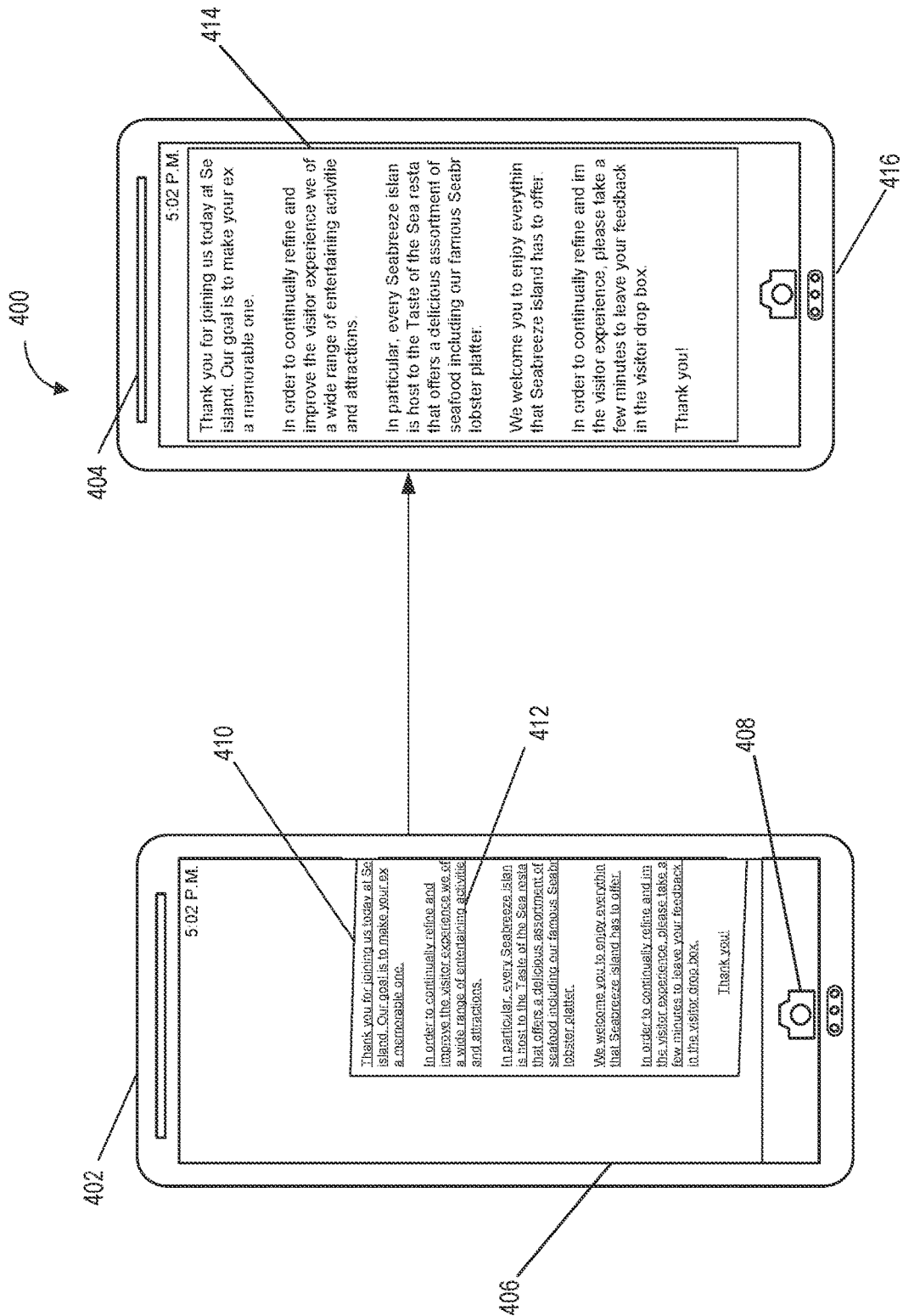
FIG. 4 depicts an example of a computing device configured to generate indications based on detected characters according to example embodiments of the present disclosure.

FIG. 4 depicts an example of a computing device configured to generate indications based on detected characters according to example embodiments of the present disclosure. A computing device 400 can include one or more attributes and/or capabilities of the computing device 102, the computing system 130, the training computing system 150, and/or the computing device 200. As shown in FIG. 4, the computing device 400 includes a device state 402, a device state 404, an image 406, an image capture interface element 408, an object 410, one or more visual indications 412, output 414, and an output component 416.

As shown in FIG. 4, the computing state 402 is the state of the computing device 400 after the computing device 400 has captured the image 406. The image 406 is an image of the document 410 (a paper letter welcoming a visitor to Seabreeze Island) which is displayed on a display portion of the computing device 400. The image 406 can be captured based on user interaction with the image capture interface element 408 which can be used to activate the camera of the computing device 400 and capture the image 406. In some embodiments, the computing device 400 can capture a video stream that includes a plurality of images, any of which can be displayed, used for optical character recognition, and/or used as a basis for generating assistive indications.

The computing device 400 can perform one or more operations to generate image data based on the image 402. Further, the computing device 400 can perform one or more optical character recognition operations and/or edge detection operations on the image data. In some embodiments, the computing device 400 can use one or more machine-learned models to generate character data based at least in part on input which can include the image data.

In this example, the computing device 400 can detect edges in the image 406. For example, the computing device 400 can determine that the rightmost characters that are visible in the image 406 are followed by a space (e.g., whitespace) that is less than a predetermined distance. When the distance between a character and the edge of an image exceeds the predetermined distance, the space may be associated with a margin or a column break. When the distance between a character and the edge of an image is less than the predetermined distance, the character may be part of an unrecognized word (e.g., a word that had been truncated). For example, the first line of characters in the image 406 indicates "Thank you for joining us today at Se" in which the word "Seabreeze" was truncated to read "Se" and which would read "Thank you for joining us today at Seabreeze" if the entire portion of the document were visible. The computing device 400 may generate a synthetic voice that reads out the words "Thank you for joining us today at" then pause and read out the characters "S" and "e" one character at a time.

By way of further example, the eighth line of characters in the image 406 indicates "In particular, every Seabreeze islan" in which the word "island" was truncated to read "islan" and which would read "In particular, every Seabreeze island" if the entire portion of the document were captured. The computing device 400 can determine that the characters "In particular, every Seabreeze" are associated with one or more recognized words (e.g., a combination of characters that corresponds to dictionary words stored in the computing device 400) and may generate a synthetic voice that reads out the words "In particular, every Seabreeze." The computing device 400 can also determine that the characters "islan" are associated with one or more unrecognized words (e.g., a combination of characters that does not correspond to a dictionary word) and after the words "In particular, every Seabreeze" are read out, can generate one or more auditory indications (e.g., a musical tone) and then generate a synthetic voice that reads out the characters "i," "s," "l," "a," and "n," one character at a time.

Furthermore, the computing device 400 can generate the one or more visual indications 412 which emphasizes one or more portions of the object 410 that were recognized as including one or more characters. In this example, the one or more visual indications 412 include underlining of the one or more characters that were recognized by the computing device 400. In some embodiments, the one or more visual indications can include highlighting (e.g., bright yellow highlighting superimposed around black characters).

The computing state 404 shows the state of the computing device 400 after the computing device 400 has generated character data. At least some portion of the character data is displayed on the display portion of the computing device as part of the output 414. Further, the computing device 400 can generate one or more indications including one or more auditory indications, one or more visual indications, and/or one or more haptic indications. For example one or more auditory indications including a synthetic voice that recites the content of the character data (e.g., the character data based at least in part on the one or more characters visible on the object 410). As discussed herein, the computing device 400 can generate a synthetic voice that recites one or more recognized words as whole words and/or one or more unrecognized words character by character.

The one or more auditory indications can be generated via the output component 416 which can include one or more loudspeakers. In some embodiments, the output component 416 can be configured to generate one or more haptic indications (e.g., vibrations) including one or more vibrations produced by a vibratory motor of the output component 416.

Figure 5:
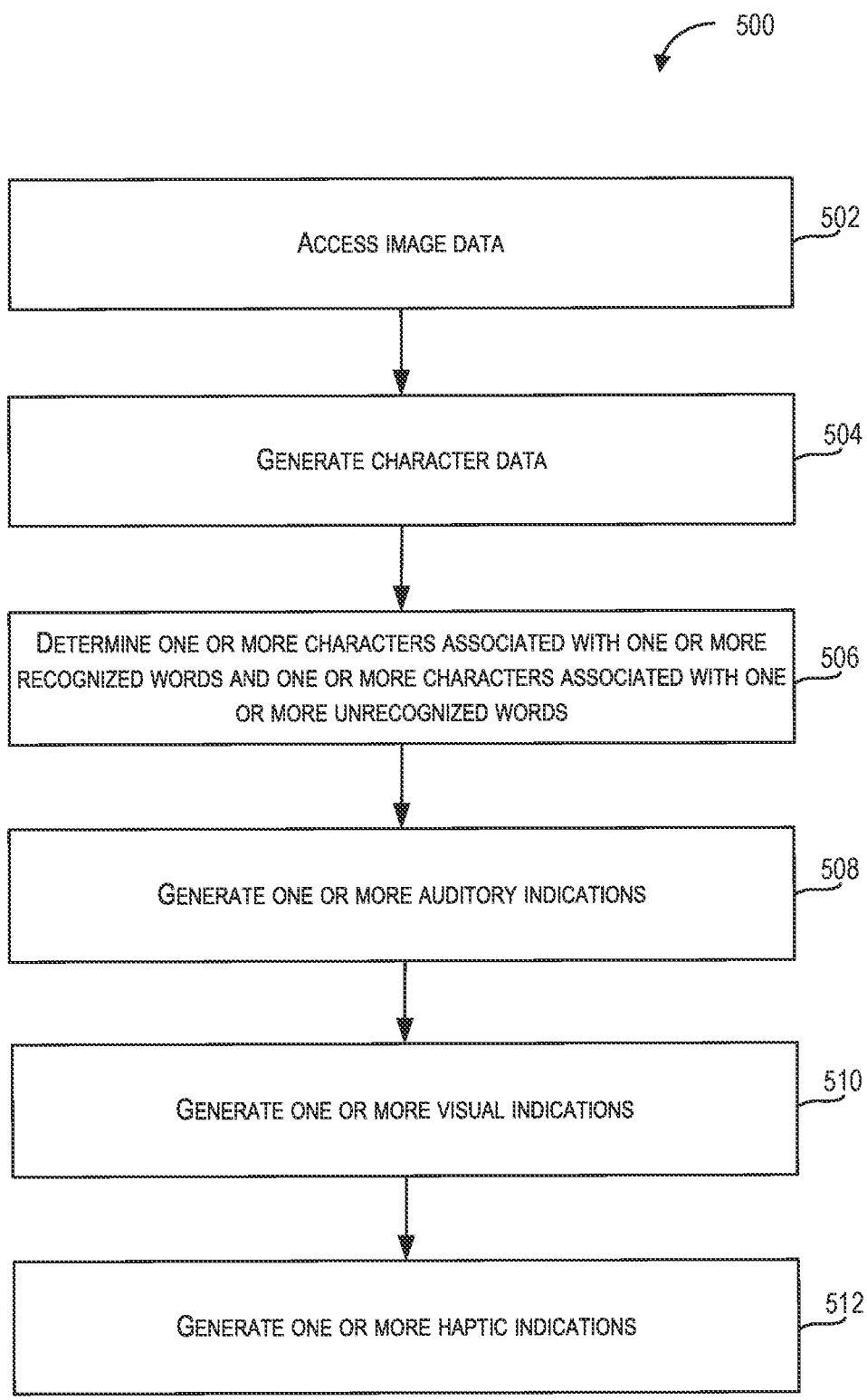
FIG. 5 depicts a flow diagram of generating assistive indications based on detected characters according to example embodiments of the present disclosure.

FIG. 5 depicts a flow diagram of generating assistive indications based on detected characters according to example embodiments of the present disclosure. One or more portions of the method 500 can be executed and/or implemented on one or more computing devices or computing systems including, for example, the computing device 102, the computing system 130, the training computing system 150, and/or the computing device 300. Further, one or more portions of the method 500 can be executed or implemented as an algorithm on the hardware devices or systems disclosed herein. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 502, the method 500 can include accessing image data. The image data can include at least one image. For example, the computing device 102 can access image data stored on a storage device of the computing device 102. The image data can be based at least in part on an image (e.g., an image of a document) captured by a camera of the computing device 102.

At 504, the method 500 can include generating character data. The character data can be based at least in part on the image data and/or one or more optical character recognition operations. Further, the character data can include one or more characters associated with the at least one image. For example, the computing device 102 can generate character data that includes the location and recognized identity of each of the one or more characters (e.g., that a particular portion of the at least one image is associated with the letter "e"). Further, the computing device 102 can determine the spacing around the one or more characters.

At 506, the method 500 can include determining the one or more characters that are associated with one or more recognized words and the one or more characters that are associated with one or more unrecognized words. The computing device 102 can analyze various features (e.g., the spacing of the one or more characters and/or whether a word formed by the one or more characters corresponds to a dictionary word) of the one or more characters to determine the one or more characters that are associated with one or more recognized words and the one or more characters that are associated with one or more unrecognized words.

At 508, the method 500 can include generating one or more auditory indications. The one or more auditory indications can include a synthetic voice that recites the one or more recognized words and the one or more unrecognized words. Further, the synthetic voice can recite each of the one or more unrecognized words one character at a time. For example, the computing device 102 can generate, via an audio output system (e.g., loudspeakers) of the computing device 102, synthetic speech corresponding to the one or more recognized words and/or the one or more unrecognized words. When the computing device 102 determines that a word is an unrecognized word, the computing device 102 can recite the individual characters of the unrecognized word one character at a time.

At 510, the method 500 can include generating, based at least in part on the character data, one or more visual indications associated with the one or more characters. For example, the computing device 102 can include a display device and the computing device 102 can generate one or more visual indications (e.g., highlights) that are superimposed over the at least one image of the one or more characters displayed on the display device.

At 512, the method 500 can include generating one or more haptic indications based at least in part on the character data. For example, the computing device 102 can include one or more haptic motors that vibrate when an unrecognized word is recited by the synthetic voice.

Figure 6:
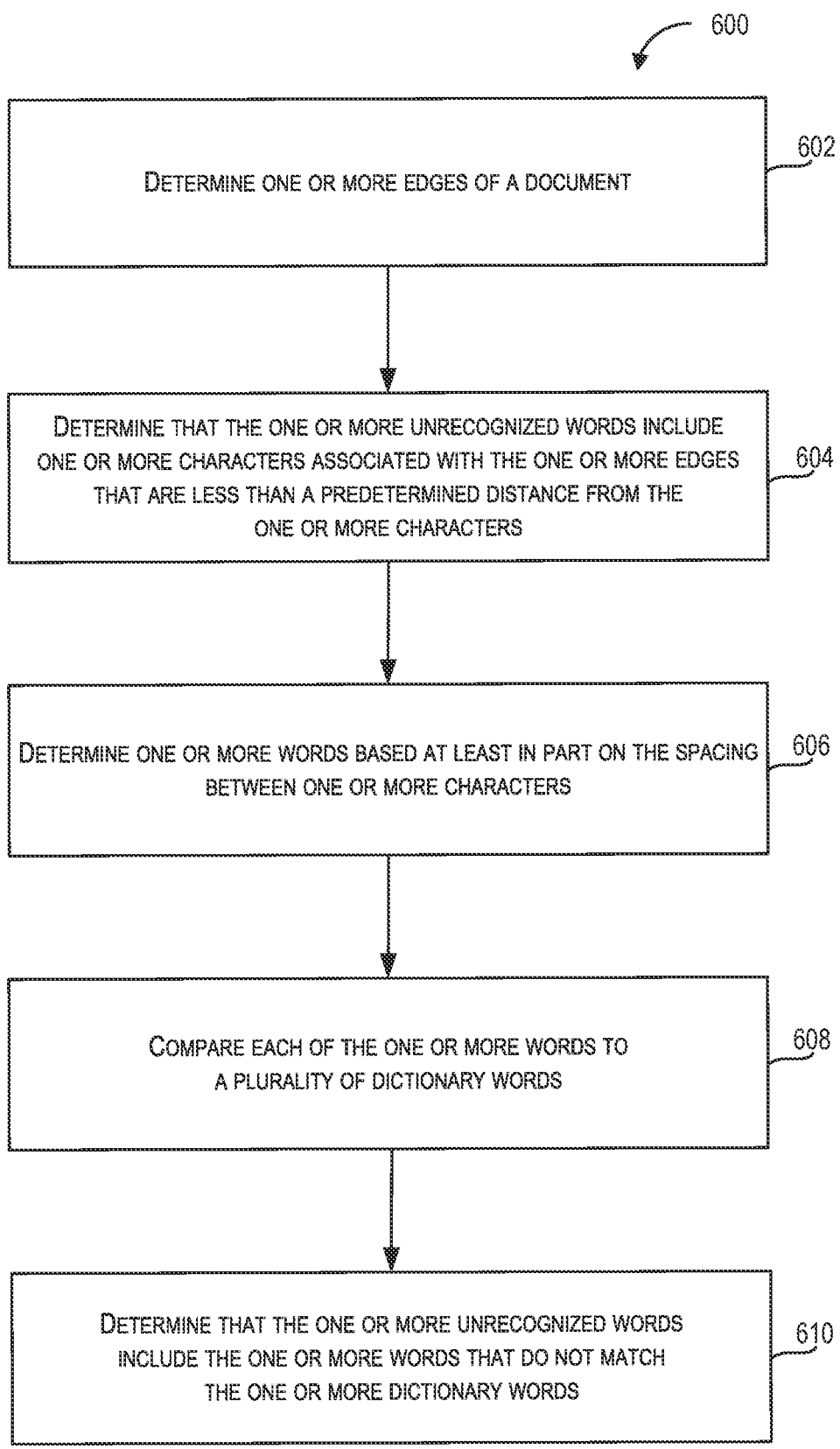
FIG. 6 depicts a flow diagram of generating assistive indications based on detected characters according to example embodiments of the present disclosure.

FIG. 6 depicts a flow diagram of generating assistive indications based on detected characters according to example embodiments of the present disclosure. One or more portions of the method 600 can be executed and/or implemented on one or more computing devices or computing systems including, for example, the computing device 102, the computing system 130, the training computing system 150, and/or the computing device 300. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include determining one or more edges of a document depicted in the at least one image. For example, the at least one image may depict the page of a book with rectangular pages and margins of one and a half (1.5) centimeters along the four edges of each page. The computing device 102 can analyze the features of the at least one image and determine that the four edges of the book's pages and the four edges of the book's margins are included in the one or more edges of the document.

At 604, the method 600 can include determining that the one or more unrecognized words include the one or more characters that are less than a predetermined distance from the one or more edges. For example, if the page of a book is folded in half and the distance between a character and the edge of the book is one (1) millimeter, the computing device 102 can determine that the character and incomplete word associated with that particular edge of the book is an unrecognized word.

At 606, the method 600 can include determining one or more words in the at least one image based at least in part on a spacing between the one or more characters. For example, the computing device 102 can use the image data and/or the character data to determine that the one or more characters that are separated by less half (0.5) the width of a character are part of the same word.

At 608, the method 600 can include comparing each of the one or more words to a plurality of dictionary words. For example, the computing device 102 can compare the included characters, the ordering of the characters, and the number of characters in each of the one or more words to the respective included characters, ordering of characters, and number of characters in each of the plurality of dictionary words.

At 610, the method 600 can include determining that the one or more unrecognized words are the one or more words that do not match any of the plurality of dictionary words. For example, the computing device 102 can determine that a word is an unrecognized word when the included characters, the ordering of the characters, and the number of characters in each of the one or more words does not match any of the dictionary words in the plurality of words.

Figure 7:
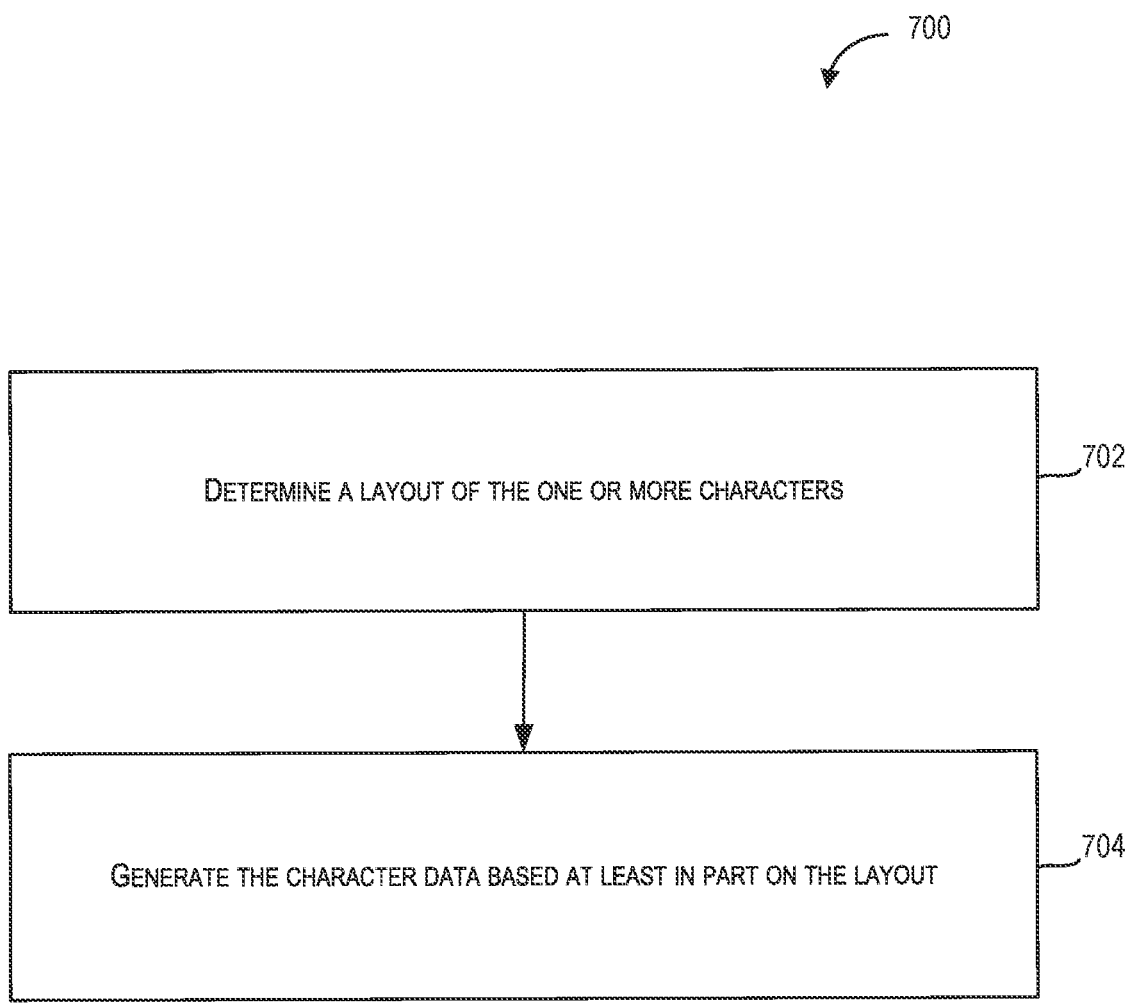
FIG. 7 depicts a flow diagram of generating assistive indications based on detected characters according to example embodiments of the present disclosure.

FIG. 7 depicts a flow diagram of generating assistive indications based on detected characters according to example embodiments of the present disclosure. One or more portions of the method 700 can be executed and/or implemented on one or more computing devices or computing systems including, for example, the computing device 102, the computing system 130, the training computing system 150, and/or the computing device 300. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining a layout of the one or more characters with respect to the at least one image. For example, the computing device 102 can include performing one or more operations to analyze the at least one image and determine the locations of the one or more characters with respect to the at least one image.

At 704, the method 700 can include generating the character data based at least in part on the layout. For example, the computing device 102 can use the layout of the one or more characters to generate character data that corresponds to the at least one image and includes characters representing a blank space to represent the spaces in the at least one image in which no characters were recognized and/or detected.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of generating assistive indications based on detected characters, the computer-implemented method comprising:
   accessing, by a computing device comprising one or more processors, image data comprising at least one image;
   generating, by the computing device, based at least in part on the image data and one or more optical character recognition operations, character data comprising one or more characters associated with the at least one image;
   determining, by the computing device, first characters of the one or more characters that are associated with one or more recognized words and second characters of the one or more characters that are associated with one or more unrecognized words; and
   generating, by the computing device, one or more auditory indications comprising a synthetic voice that recites the one or more recognized words and the one or more unrecognized words, wherein the synthetic voice recites each of the one or more unrecognized words one character at a time, wherein the one or more auditory indications comprise an auditory indication that occurs a predetermined amount of time before each of the one or more unrecognized words is recited by the synthetic voice.

2. The computer-implemented method of claim 1, further comprising:
   generating, by the computing device, based at least in part on the character data, one or more visual indications associated with the one or more characters.

3. The computer-implemented method of claim 2, wherein the one or more visual indications comprise one or more colors highlighting the one or more characters, one or more shapes around the one or more characters, darkening the one or more characters, or lightening the one or more characters.

4. The computer-implemented method of claim 1, wherein the determining, by the computing device, the first characters of the one or more characters that are associated with the one or more recognized words and the second characters of the one or more characters that are associated with the one or more unrecognized words comprises:
   determining, by the computing device, one or more words in the at least one image based at least in part on a spacing between the one or more characters; and
   comparing, by the computing device, each of the one or more words to a plurality of dictionary words; and
   determining, by the computing device, that the one or more unrecognized words are one or more words that do not match any of the plurality of dictionary words.

5. The computer-implemented method of claim 1, wherein the generating, by the computing device, based at least in part on the image data and the one or more optical character recognition operations, the character data comprising the one or more characters associated with the at least one image comprises:
   determining, by the computing device, a layout of the one or more characters with respect to the at least one image; and
   generating, by the computing device, the character data based at least in part on the layout.

6. The computer-implemented method of claim 5, wherein the layout comprises an arrangement of the one or more characters, wherein the arrangement indicates a reading direction of the one or more characters.

7. The computer-implemented method of claim 1, wherein the one or more optical character recognition operations comprise one or more operations performed by one or more machine-learned models configured to receive the image data as input and generate output comprising the character data.

8. The computer-implemented method of claim 1, wherein an amplitude of the synthetic voice is increased when the one or more unrecognized words are being recited by the synthetic voice.

9. One or more tangible non-transitory computer-readable media storing computer-readable instructions that when executed by one or more processors cause the one or more processors to perform operations, the operations comprising:
   accessing image data comprising at least one image;
   generating, based at least in part on the image data and one or more optical character recognition operations, character data comprising one or more characters associated with the at least one image;
   determining, based at least in part on the character data, first characters of the one or more characters that are associated with one or more recognized words and second characters of the one or more characters that are associated with one or more unrecognized words; and
   generating one or more auditory indications comprising a synthetic voice that recites the one or more recognized words and the one or more unrecognized words, wherein the one or more auditory indications comprise one or more musical tones, wherein the synthetic voice recites each of the one or more unrecognized words one character at a time, and wherein the one or more musical tones are generated before each of the one or more unrecognized words is recited by the synthetic voice.

10. A computing system comprising:
one or more processors;
one or more non-transitory computer-readable media storing instructions that when executed by the one or more processors cause the one or more processors to perform operations, the operations comprising:
accessing image data comprising at least one image;
generating, based at least in part on the image data and one or more optical character recognition operations, character data comprising one or more characters associated with the at least one image;
determining, based at least in part on the character data, first characters of the one or more characters that are associated with one or more recognized words and second characters of the one or more characters that are associated with one or more unrecognized words;
generating one or more auditory indications comprising a synthetic voice that recites the one or more recognized words and the one or more unrecognized words, wherein the synthetic voice recites each of the one or more unrecognized words one character at a time; and
generating, by the computing device, one or more haptic indications based at least in part on the character data, wherein the one or more haptic indications are generated before each of the one or more unrecognized words is recited by the synthetic voice.

11. The computing system of claim 10, wherein the image data is captured via, one or more sensors comprising one or more cameras.

12. The computing system of claim 10, wherein the recitation of each character of the one or more unrecognized words by the synthetic voice is preceded by a pause of predetermined duration.

13. A computer-implemented method of generating assistive indications based on detected characters, the computer-implemented method comprising:
accessing, by a computing device comprising one or more processors, image data comprising at least one image;
generating, by the computing device, based at least in part on the image data and one or more optical character recognition operations, character data comprising one or more characters associated with the at least one image;
determining, by the computing device, first characters of the one or more characters that are associated with one or more recognized words and second characters of the one or more characters that are associated with one or more unrecognized words; and
generating, by the computing device, one or more auditory indications comprising a synthetic voice that recites the one or more recognized words and the one or more unrecognized words, wherein the synthetic voice recites each of the one or more unrecognized words one character at a time, wherein the one or more auditory indications comprise an auditory indication that occurs a predetermined amount of time after each of the one or more unrecognized words is recited by the synthetic voice.

14. A computer-implemented method of generating assistive indications based on detected characters, the computer-implemented method comprising:
accessing image data comprising at least one image;
generating, based at least in part on the image data and one or more optical character recognition operations, character data comprising one or more characters associated with the at least one image;
determining, based at least in part on the character data, first characters of the one or more characters that are associated with one or more recognized words and second characters of the one or more characters that are associated with one or more unrecognized words;
generating one or more auditory indications comprising a synthetic voice that recites the one or more recognized words and the one or more unrecognized words, wherein the synthetic voice recites each of the one or more unrecognized words one character at a time; and
generating, by the computing device, one or more haptic indications based at least in part on the character data, wherein the one or more haptic indications are generated after each of the one or more unrecognized words is recited by the synthetic voice.

15. One or more tangible non-transitory computer-readable media storing computer-readable instructions that when executed by one or more processors cause the one or more processors to perform operations, the operations comprising:
accessing image data comprising at least one image;
generating, based at least in part on the image data and one or more optical character recognition operations, character data comprising one or more characters associated with the at least one image;
determining, based at least in part on the character data, first characters of the one or more characters that are associated with one or more recognized words and second characters of the one or more characters that are associated with one or more unrecognized words; and
generating one or more auditory indications comprising a synthetic voice that recites the one or more recognized words and the one or more unrecognized words, wherein the one or more auditory indications comprise one or more musical tones, wherein the synthetic voice recites each of the one or more unrecognized words one character at a time, and wherein the one or more musical tones are generated after each of the one or more unrecognized words is recited by the synthetic voice.

16. A computer-implemented method of generating assistive indications based on detected characters, the computer-implemented method comprising:
accessing, by a computing device comprising one or more processors, image data comprising at least one image;
generating, by the computing device, based at least in part on the image data and one or more optical character recognition operations, character data comprising one or more characters associated with the at least one image;
determining, by the computing device, first characters of the one or more characters that are associated with one or more recognized words and second characters of the one or more characters that are associated with one or more unrecognized words wherein the determining comprises:
determining, by the computing device, one or more edges of a document depicted in the at least one image; and
determining, by the computing device, that each of the one or more unrecognized words comprise characters of the one or more characters that are less than a predetermined distance from the one or more edges; and generating, by the computing device, one or more auditory indications comprising a synthetic voice that recites the one or more recognized words and the one or more unrecognized words, wherein the synthetic voice recites each of the one or more unrecognized words one character at a time.

* * * * *